United States Patent
Woodford et al.

(10) Patent No.: US 7,042,386 B2
(45) Date of Patent: May 9, 2006

(54) SUB-APERTURE SIDELOBE AND ALIAS MITIGATION TECHNIQUES

(75) Inventors: Paul W. Woodford, Laurel, MD (US);
Gerald Davieau, Eldersburg, MD (US);
James L. Lafuse, Columbia, MD (US)

(73) Assignee: Essex Corporation, Columbia, MD (US)

( * ) Notice: Subject to any disclaimer, the term of this patent is extended or adjusted under 35 U.S.C. 154(b) by 0 days.

(21) Appl. No.: 10/833,342

(22) Filed: Apr. 28, 2004

(65) Prior Publication Data

US 2004/0227659 A1 Nov. 18, 2004

Related U.S. Application Data

(63) Continuation-in-part of application No. 10/012,049, filed on Dec. 11, 2001, now Pat. No. 6,735,346.

(51) Int. Cl.
*G01S 13/00* (2006.01)
*G01S 13/90* (2006.01)

(52) U.S. Cl. ............... 342/25 F; 342/25 R; 342/25 A; 342/25 E

(58) Field of Classification Search ............. 342/25 R, 342/25 A, 25 F, 25 E
See application file for complete search history.

(56) References Cited

U.S. PATENT DOCUMENTS

| | | | |
|---|---|---|---|
| 4,978,960 A | 12/1990 | Newcomb et al. | |
| 5,061,931 A | 10/1991 | Farina et al. | |
| 5,334,980 A | 8/1994 | Decker | |
| 5,394,151 A * | 2/1995 | Knaell et al. | ............. 342/25 R |
| 5,469,167 A | 11/1995 | Polge et al. | |
| 5,805,098 A | 9/1998 | McCorkle | |
| 5,910,785 A | 6/1999 | Normant | |
| 5,969,662 A | 10/1999 | Hellsten | |
| 6,072,419 A | 6/2000 | Normant | |
| 6,087,981 A | 7/2000 | Normant et al. | |
| 6,147,636 A | 11/2000 | Gershenson | |
| 6,384,766 B1 | 5/2002 | Ulander | |
| 6,426,718 B1 * | 7/2002 | Ridgway | ................... 342/160 |

OTHER PUBLICATIONS

Desai et al., "Convolution Backprojection Image Reconstruction for Spotlight Mode Synthetic Aperture Radar," IEEE Transactions on Image Processing, Oct. 1992, vol. 1, iss 4, p. 505-517.

J. Fortuny, "An Efficient 3-D Near-Field ISAR Algorithm," IEEE Transactions on Aerospace and Electronic Systems, Oct. 1998, vol. 34, iss 4, p. 1261-1270.

(Continued)

*Primary Examiner*—Ian J. Lobo
(74) *Attorney, Agent, or Firm*—Morrison & Foerster LLP

(57) ABSTRACT

Methods for mitigating sidelobes and aliases, providing levels of suppression in excess of 20 dB. The methods may include 1) a version of the CLEAN algorithm developed in radio astronomy, modified to work on sub-aperture images; 2) weighting functions based on the phase and amplitude statistics of the sub-aperture image pixels to select points in the CLEAN algorithm; and 3) weighting functions based on the phase and amplitude statistics of the sub-aperture image pixels to mitigate sidelobes and aliases, in conjunction with CLEAN or separately. The methods may be used with all synthetic aperture techniques and are not limited to SAR.

5 Claims, 13 Drawing Sheets

OTHER PUBLICATIONS

Lazarov et al., "Stochastic Model of Complex ISAR Signals and Spatial Correlation Image Reconstruction Procedure," Proceedings of the Second International Symposium of Trans Black Sea Region on Applied Electromagnetism, Jun. 27-29, 2000, p. 96.

Bauck et al., "Tomographic Processing of Spotlight-Mode Synthetic Aperture Radar Signals with Compensation for Wavefront Curvature," IEEE, 1998, p. 1192-1195.

Lewitt, "Reconstruction Algorithms," Transform Methods Proceedings of the IEEE, 71(3), p. 390-408, 1983.

Smith, "Cone-Beam Tomography: Recent Advances and a Tutorial Review," Optical Engineering 29(5), p. 524-534, 1990.

Mann et al., "Spotlight-Mode Synthetic Aperture Radar without Fourier Transforms," SPIE vol. 2230, p. 2-13, 1994.

Kenneth M. Chick et al. (2001) "Using the CLEAN Algorithm to Restore Undersampled Synthetic Aperture Sonar Images," OCEANS, MTS/IEEE Conference and Exhibition, pp. 170-178.

International Search Report mailed Aug. 23, 2005, issued in counterpart international application.

* cited by examiner

Figure 8: Coherent sum
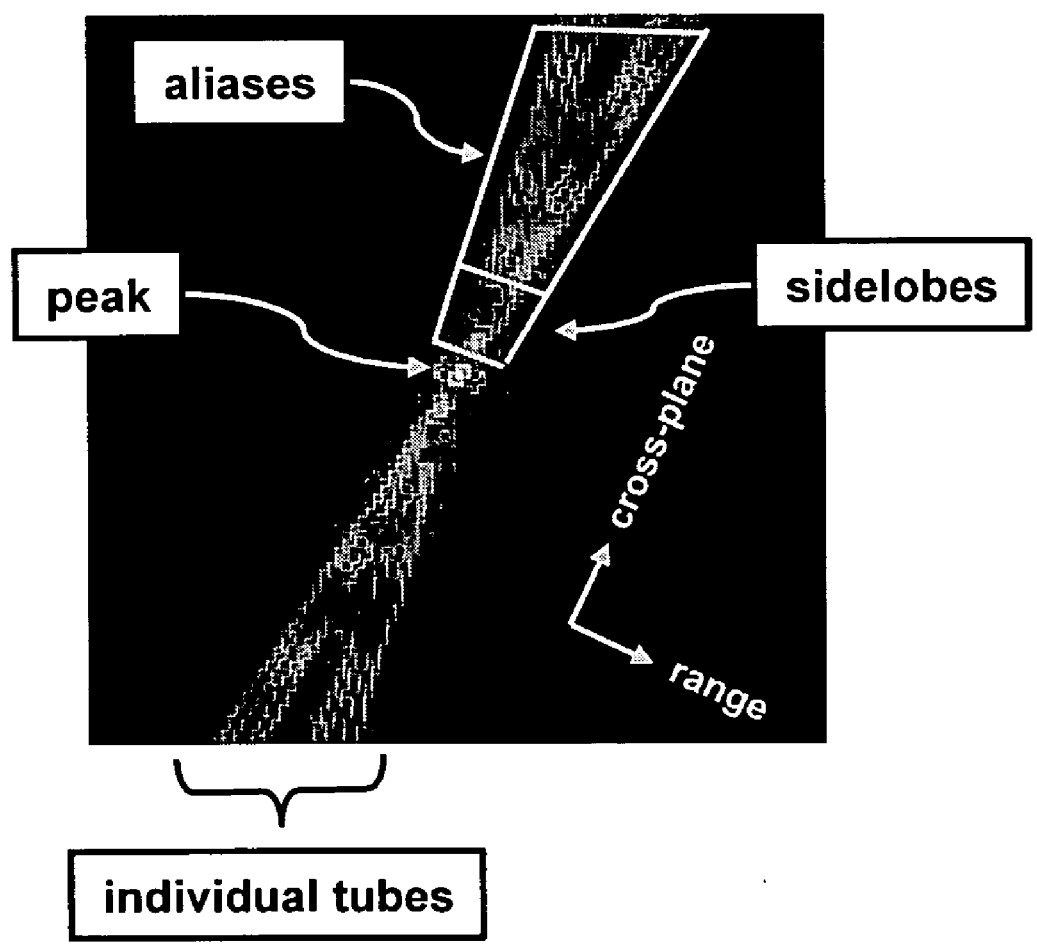

Figure 9: Standard CLEAN
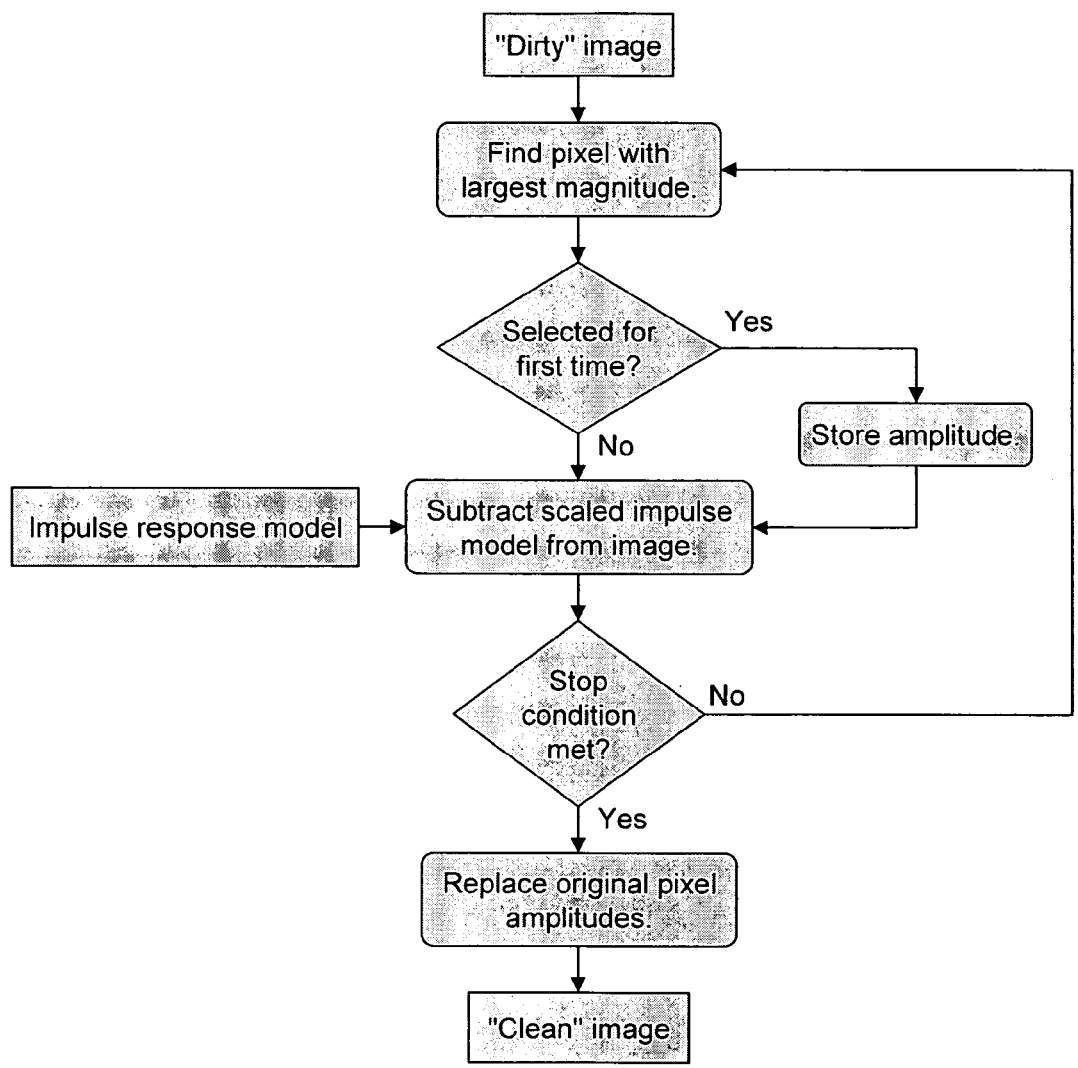

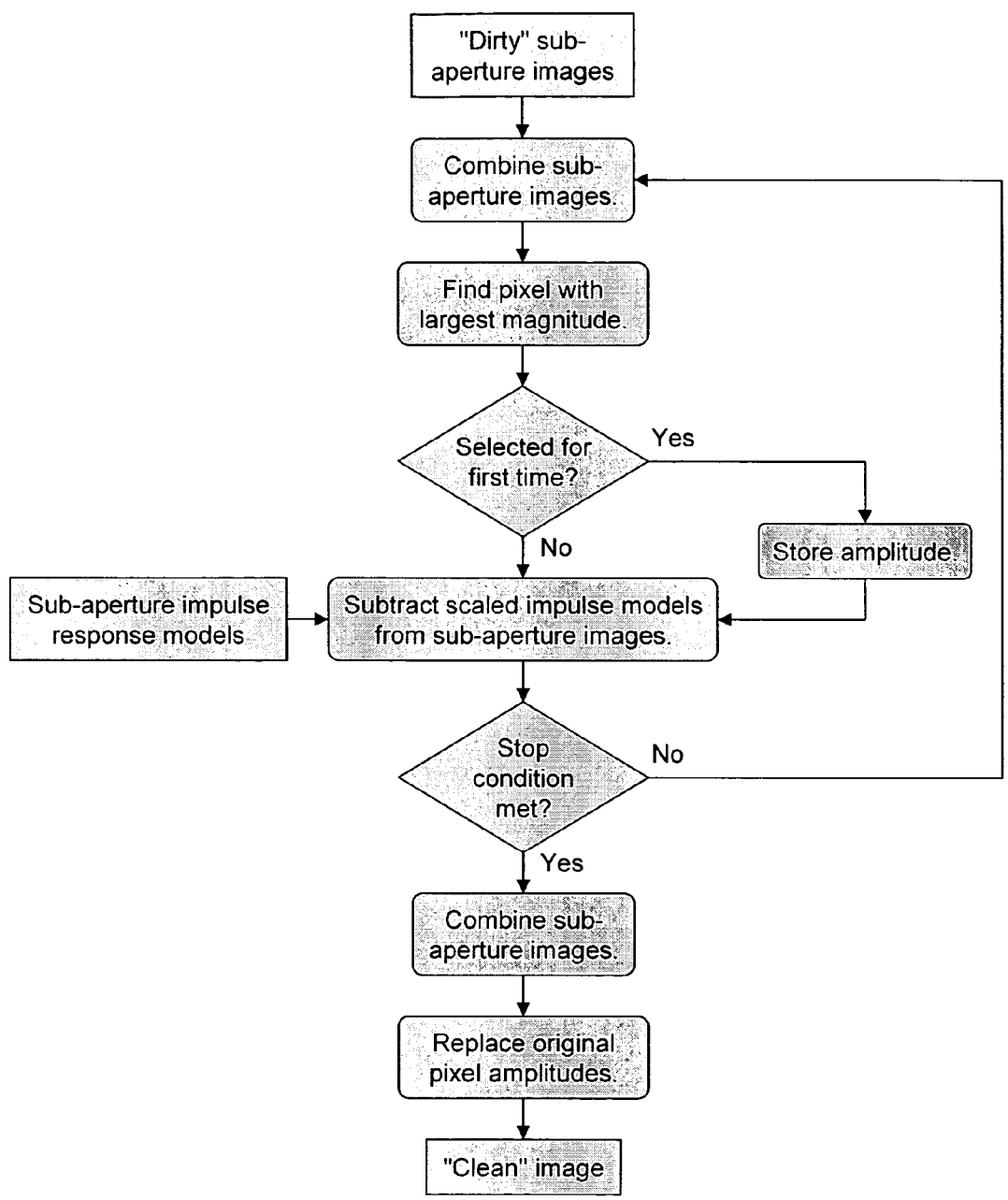
Figure 10: Sub-aperture CLEAN

Figure 11: Sub-aperture CLEAN with peak selection weighting
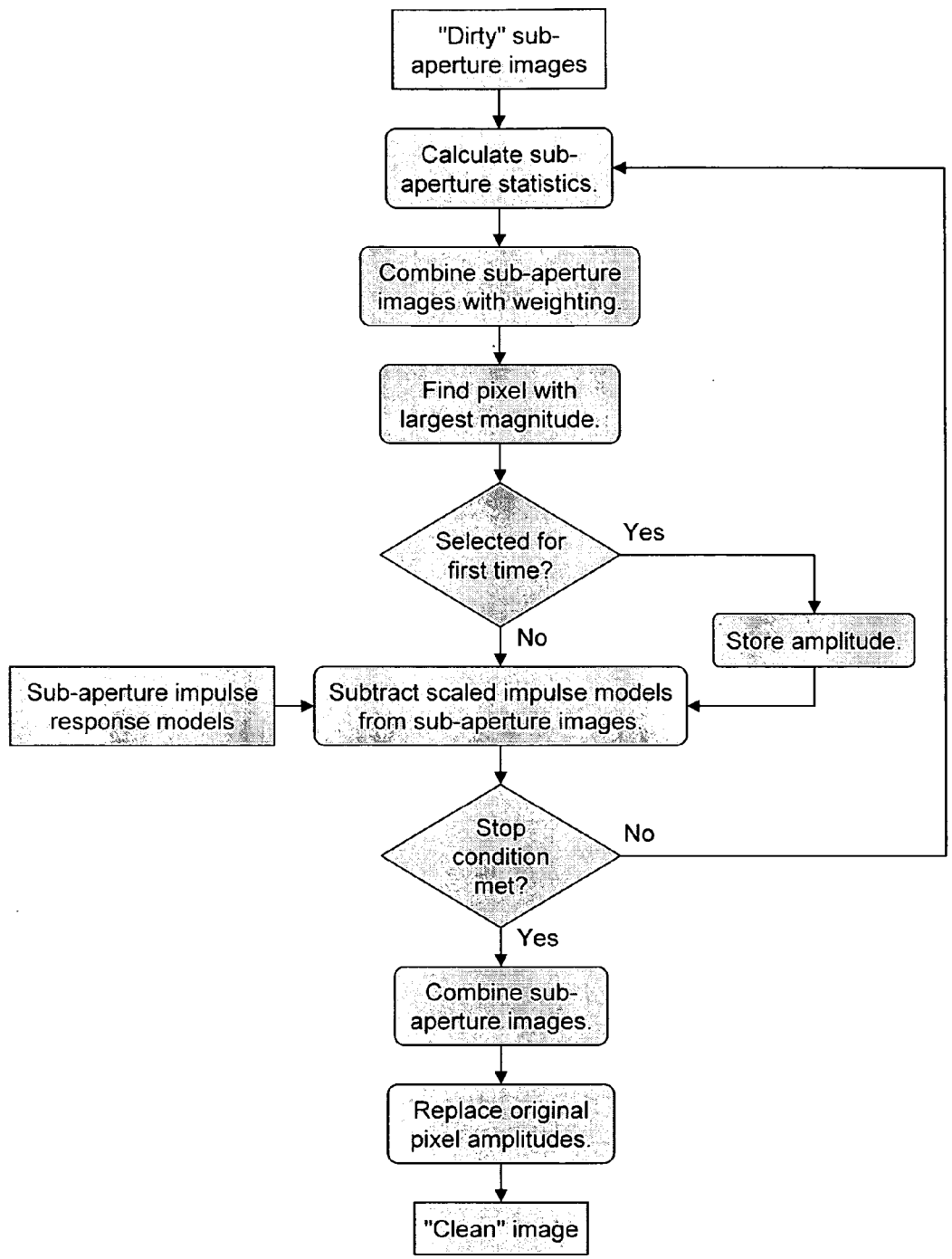

Figures 12: Coherent sum, coherence, and magnitude variance
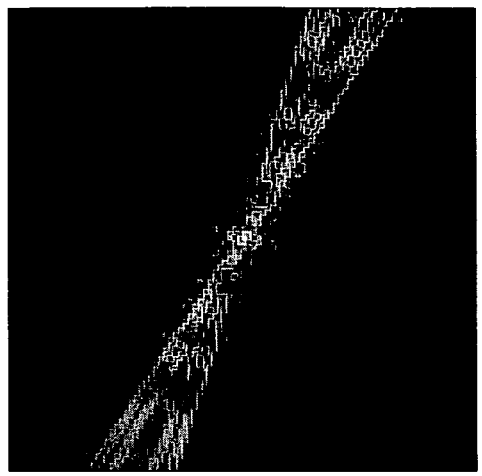
Coherent sum
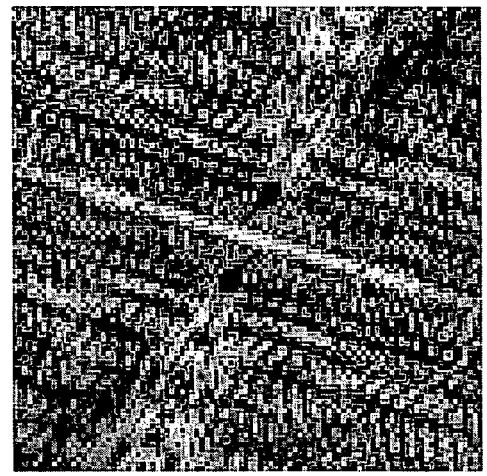
Coherence
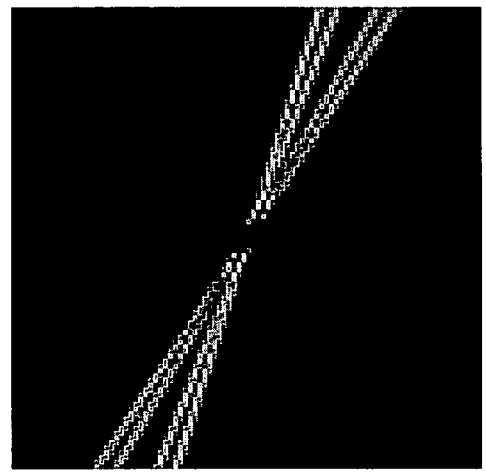
Magnitude variance

Figure 13: Coherent sum with and without weightings
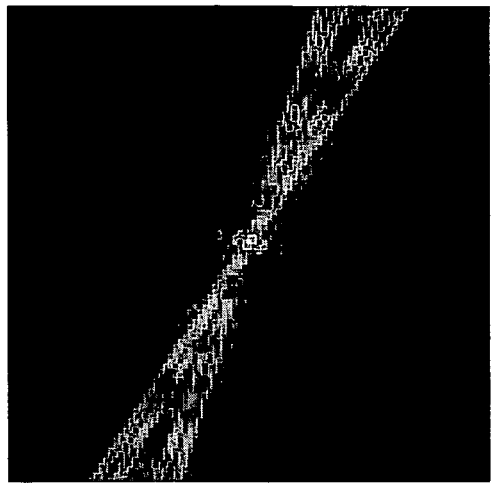
Coherent sum
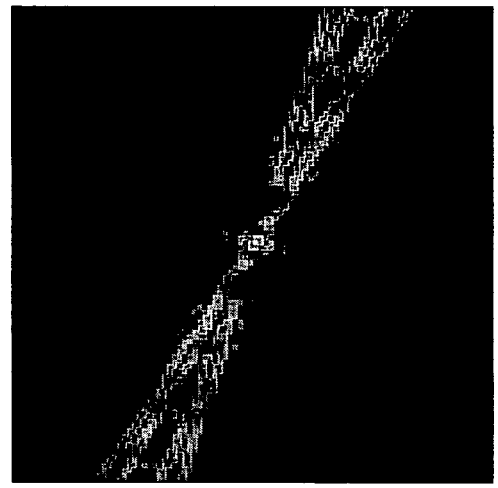
With coherence weighting
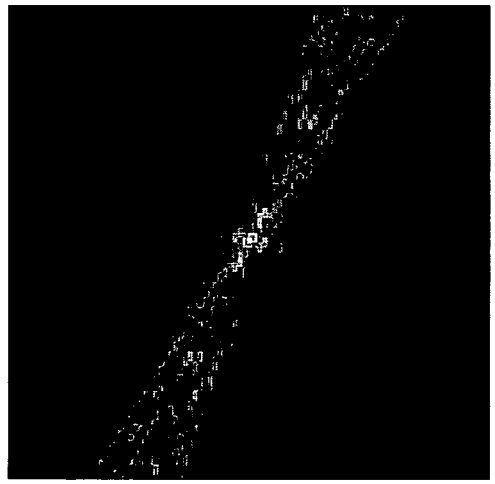
With magnitude variance weighting
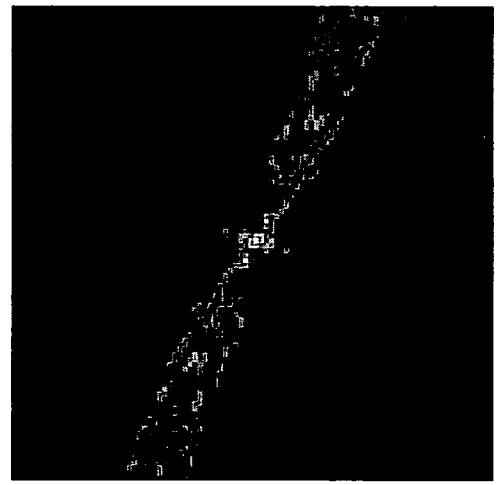
With both weightings

Figure 14: Sub-aperture CLEAN augmented by statistics
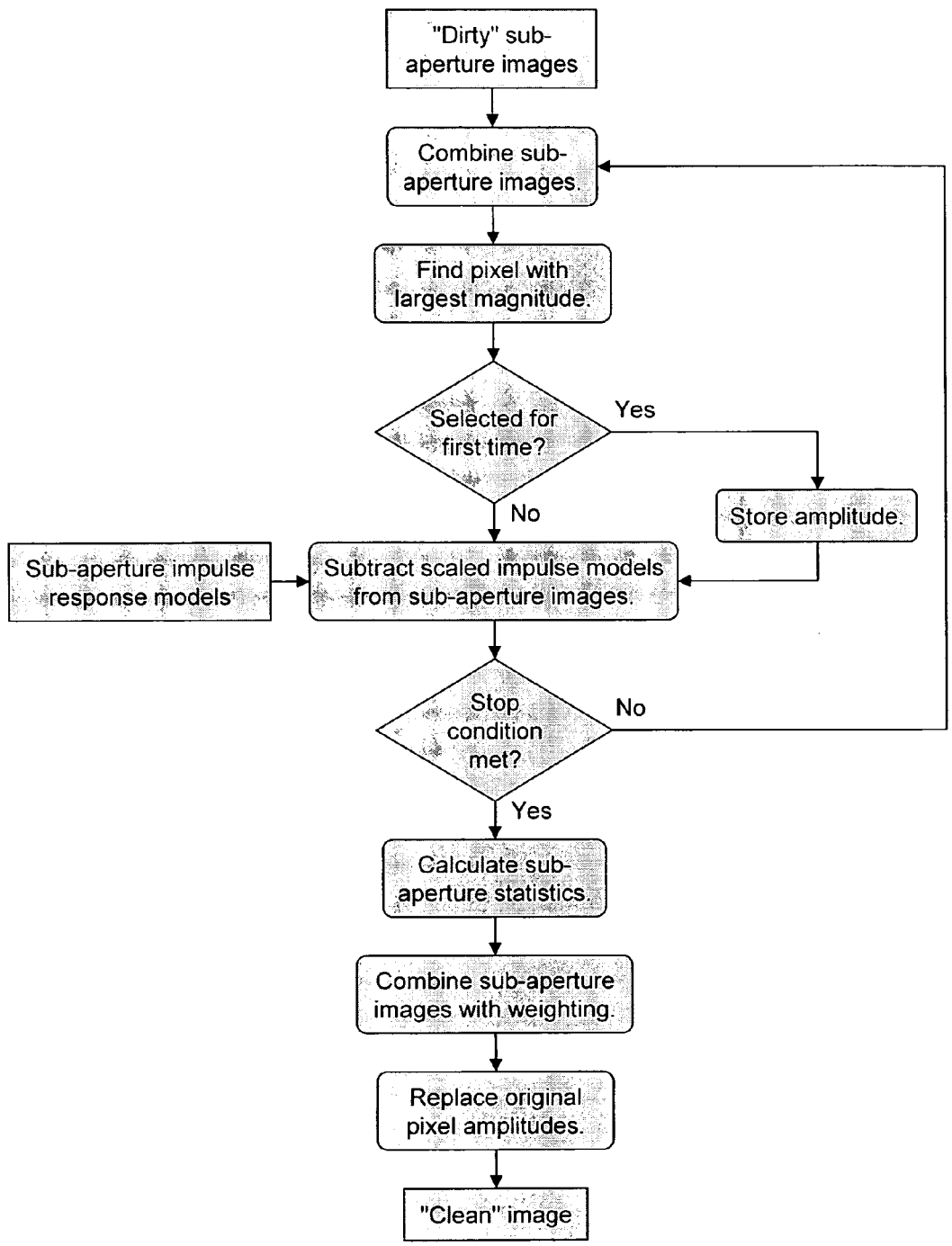

Figure 15: Quick-CLEAN
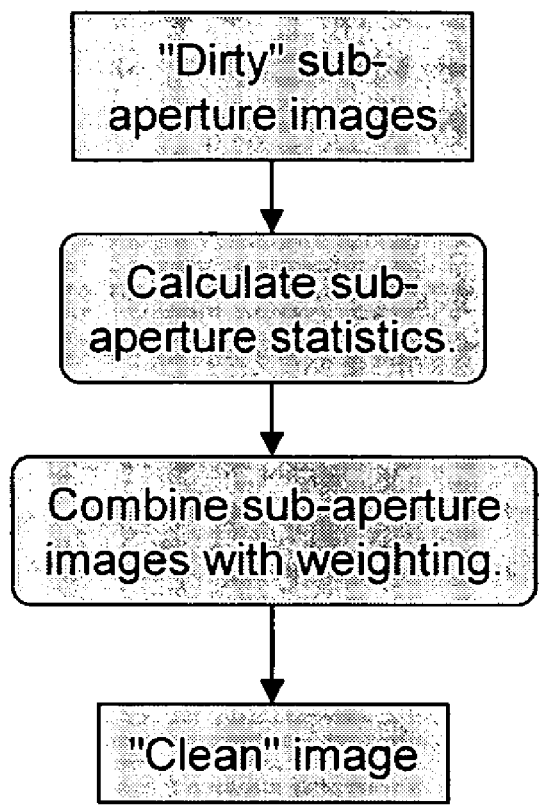

SUB-APERTURE SIDELOBE AND ALIAS MITIGATION TECHNIQUES

RELATED APPLICATIONS

The present application is a continuation-in-part of co-pending application Ser. No. 10/012,049, filed Dec. 11, 2001, for HD FOURIER TRANSFORMS FOR IRREGULARLY SAMPLED DATA, the disclosure of which Application is incorporated by reference herein.

TECHNICAL FIELD OF THE INVENTION

The present invention relates to a method for mitigating sidelobes and aliases in synthetic aperture images.

BACKGROUND OF THE INVENTION

Figure 1:
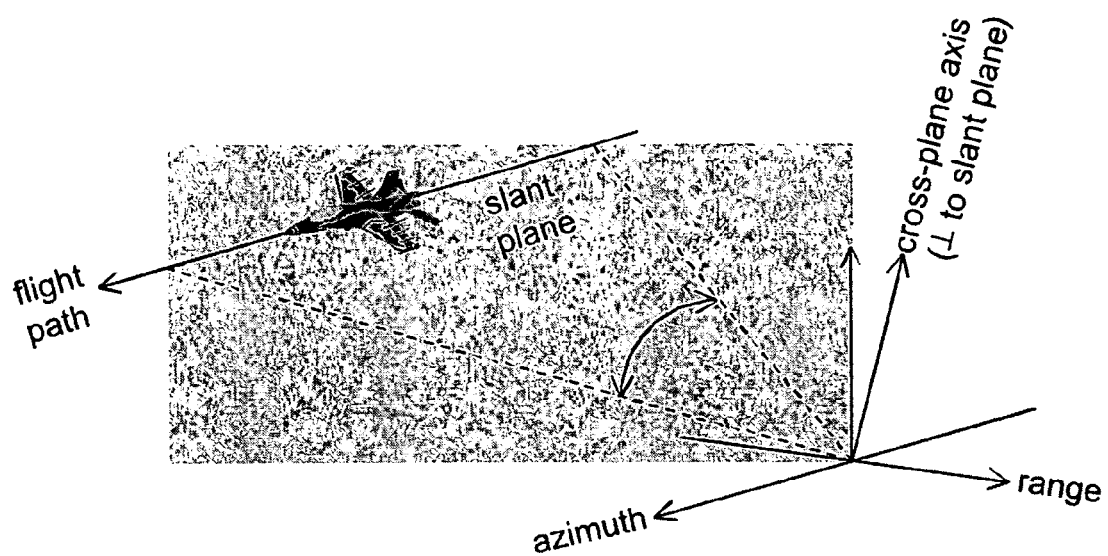

Synthetic aperture radar (SAR) is an attractive imaging technique because of its ability to operate under all lighting conditions and through clouds and haze. FIG. 1 illustrates an example of a collection of 2-D SAR data. An airplane flies past an area of interest while collecting radar data. The flight path is usually a straight line. The flight direction is called the azimuth. The direction normal from the flight path to the region of interest is called the range. The plane that is formed by the azimuth and range directions is the slant plane. The normal to the slant plane is the cross-plane. Processing algorithms form a high-resolution 2-D image of the region of interest by combining the information from all of the radar data. In doing so, the processing algorithms effectively synthesize an aperture that is much larger than the actual aperture of the antenna.

Figure 2:
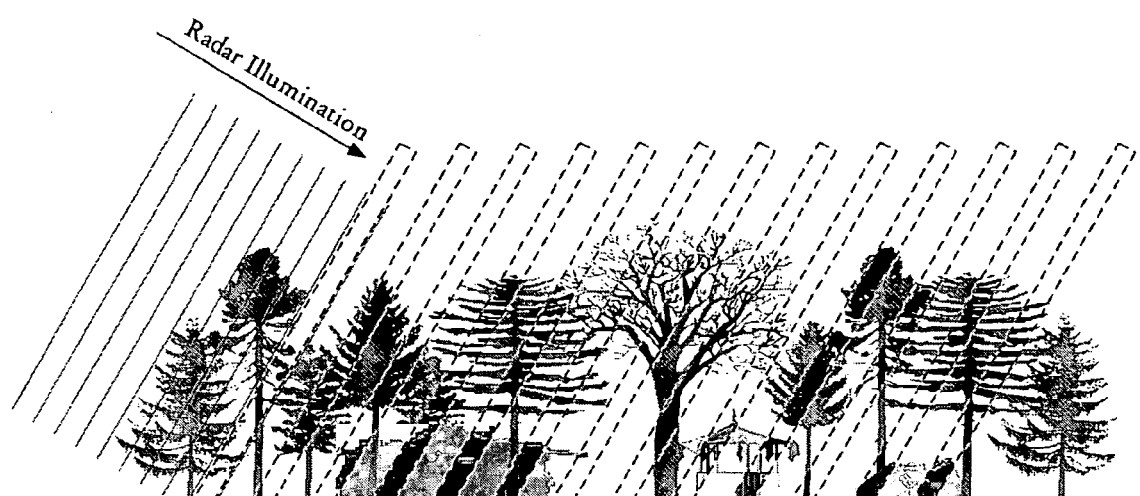
Figure 3:
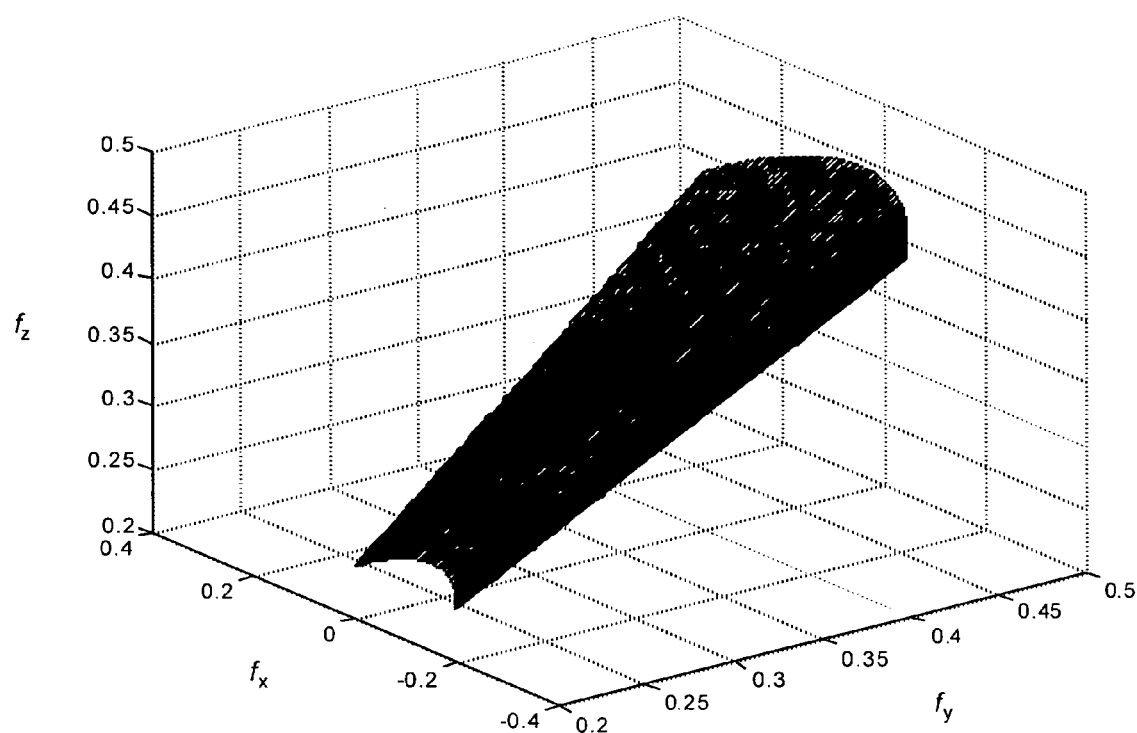
Figure 4:
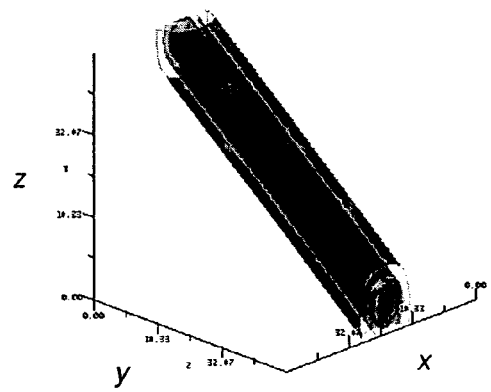

While successful in many applications, the 2-D form of SAR yields very limited information about the distribution of objects in the cross-plane dimension. Further, the 2-D form of SAR has limited utility in detecting and identifying objects obscured by overlying layers. FIG. 2 illustrates an example of 2-D SAR imaging of a 3-D scene that contains objects concealed by overlying foliage. The radar illuminates the scene from the left at a single elevation. The flight path is perpendicular to the plane of the page. Because a conventional SAR image is purely 2-D, the energy within a given (range, azimuth) pixel is the sum of the energy returned by all scatterers at that range and azimuth, regardless of their position in the cross-plane dimension. In three dimensions, the frequency space is a plane (as shown, for example, in FIG. 3) and the image pixels have a tubular shape (as shown, for example, in FIG. 4). Energy returned from the overlying layers (foliage, in the example of FIG. 2) is integrated with the energy returned from the objects below, which reduces the signal-to-clutter ratio of those objects. Resolution in the third dimension may be required to separate the desired signal from the clutter.

Figure 5:
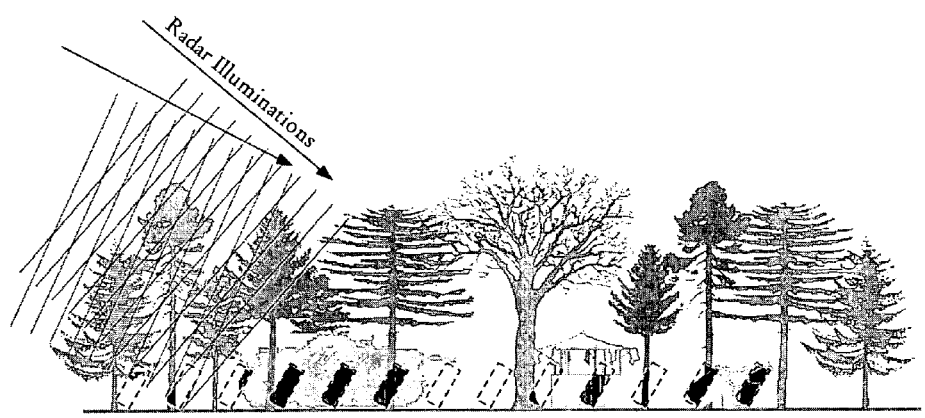
Figure 6:
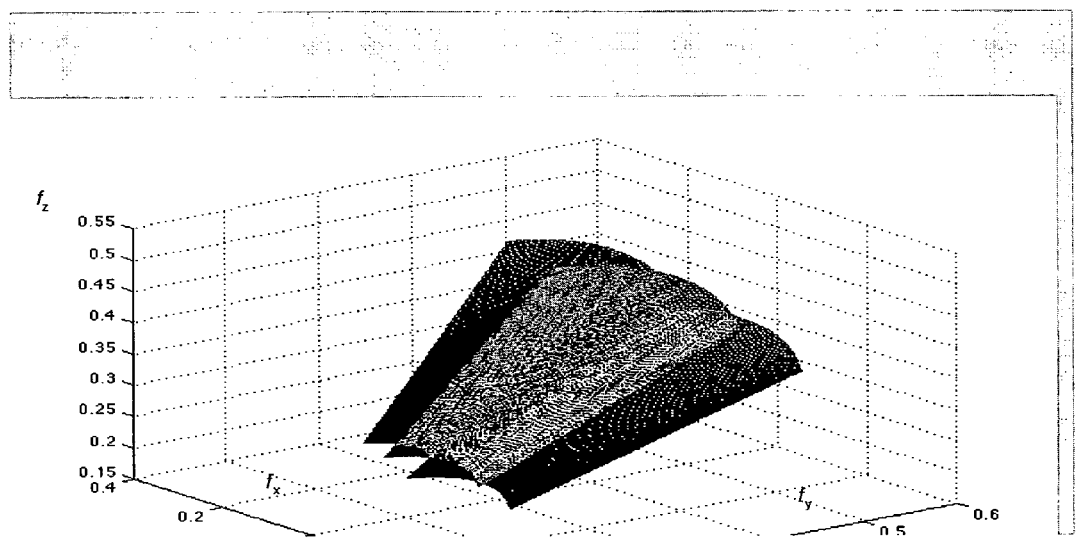
Figure 7:
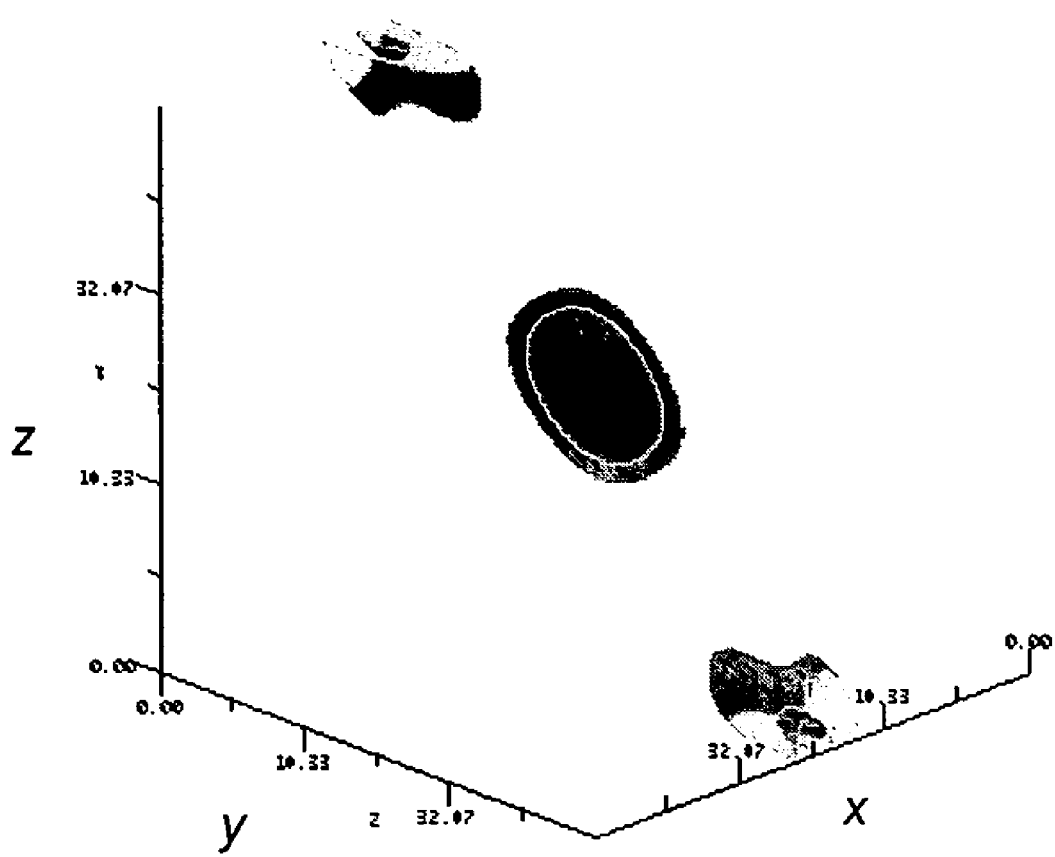

Three-dimensional SAR extends the synthetic aperture concept used in one dimension (azimuth) in conventional SAR to two dimensions (azimuth and elevation). FIG. 5 illustrates 3-D SAR imaging of a 3-D scene. The radar now illuminates the scene from the left at multiple elevations, which creates a synthetic aperture that has two dimensions instead of one. The frequency space from this type of collection contains multiple planes, as shown, for example, in FIG. 6. The resulting impulse response shows resolution in all three dimensions, as shown, for example, in FIG. 7. The returns from the overlying layers and the objects on the ground are contained in different voxels, which improves the signal-to-clutter ratio, enabling easier detection and identification of the objects. The 2-D aperture also effectively increases the coherent integration time, which improves the signal-to-noise ratio. It is noted that interferometric SAR (IFSAR), which collects data at two elevations and is sometimes referred to as 3-D SAR, is in fact a degenerate case of true 3-D SAR.

A drawback to 3-D SAR is the difficulty in obtaining sufficient 3-D sampling. In many cases there will not be enough samples to meet the Nyquist sampling rate. Furthermore, the samples will most likely not have uniform spacing. This sparse, irregular sampling will cause sidelobes and aliases in the cross-plane dimension. These aliases and sidelobes are illustrated in FIG. 8. FIG. 8 depicts a slice of a 3-D impulse response on a 35 dB log scale, with the range and cross-plane directions noted. The peak of the impulse response is in the center of the image. A region of sidelobes is adjacent to the peak. Beyond the sidelobes, where the Nyquist sampling rate is no longer met, aliases occur. In this region, the tubes from the individual passes that make up the 3-D collection are visible. The sidelobes and aliases reduce the image quality. Consequently, the need exists for techniques to mitigate sidelobes and aliases.

DESCRIPTION OF THE INVENTION

Essex Corporation has developed techniques to mitigate sidelobes and aliases, and demonstrated levels of suppression in excess of 20 dB. These new techniques disclosed in this document include 1) a version of the CLEAN algorithm developed in radio astronomy, modified to work on sub-aperture images; 2) weighting functions based on the phase and amplitude statistics of the sub-aperture image pixels to select points in the CLEAN algorithm; and 3) weighting functions based on the phase and amplitude statistics of the sub-aperture image pixels to mitigate sidelobes and aliases, in conjunction with CLEAN or separately. This discussion will generally assume two dimensions and use the terms "images" and "pixels", but the techniques discussed are applicable to images with more than two dimensions.

Other researchers have investigated using CLEAN for sidelobe mitigation, both in conventional 2-D SAR and in 3-D SAR. In general, the CLEAN algorithm works by selecting a bright point and subtracting a model of the impulse response from that point, thus revealing weaker points that may have been hidden by the sidelobes of the bright point. Different variants of CLEAN use different methods of selecting bright points and of subtracting the impulse response models, but the basic concept remains the same. One major advantage of CLEAN over other mitigation techniques, particularly in 3-D SAR, is that it reduces aliases as well as sidelobes.

For the purposes of this discussion, the conventional CLEAN algorithm can be thought to operate as shown in FIG. 9. The original, "dirty" image is searched to find the pixel with the largest magnitude. The amplitude of that pixel is stored for later re-insertion into the image. The impulse response model is centered on that pixel, scaled, and subtracted from the image, which is now considered the working image. The scaling is calculated such that the peak of the scaled impulse response model is the amplitude of the selected pixel times a factor γ. The factor γ governs how fast the image is cleaned. A larger γ cleans the image more rapidly, but with a greater risk of introducing artifacts. After the subtraction, a stop condition is checked. The stop condition may be a number of iterations, a length of time, or a threshold for the maximum pixel magnitude in the working image. If the stop condition is not met, the process is repeated on the working image. Note that in subsequent iterations, the amplitude of the selected pixel is only stored if that pixel is being selected for the first time. Once the stop condition is met, the original pixel amplitudes are replaced in the image; the sidelobes are subtracted, but the real points are restored.

Essex has developed several modifications to CLEAN that enhance its utility. One modification is to break the aperture used to create the image into sub-apertures, and work on sub-apertures instead of the full aperture. The full aperture may still be used for point selection, but impulses are modeled and subtracted for each individual sub-aperture. This modification addresses the known weakness that CLEAN has with extended objects that are not exactly ideal impulse responses. Using sub-apertures better handles those types of objects because they are more likely to look like an ideal impulse response over a sub-aperture than over a full aperture.

FIG. 10 illustrates the sub-aperture modification. The input to the process is now assumed to be "dirty" sub-aperture images. The sub-aperture images are combined to find the pixel with the largest magnitude. The amplitude of that pixel is stored for later re-insertion into the image. Then, for each sub-aperture image, the impulse response for that sub-aperture is centered on that pixel, scaled, and subtracted from the image. The sub-aperture images are now considered the working images. The scaling is calculated such that the peak of the scaled sub-aperture impulse response model is the amplitude of the selected pixel in that sub-aperture times a factor $\gamma$, which is defined the same as in the conventional CLEAN. After the subtraction, a stop condition is checked. The stop condition may be a number of iterations; a length of time; or a threshold for the maximum pixel magnitude in the working images, individually or combined. If the stop condition is not met, the process is repeated on the working images. As in conventional CLEAN, the amplitude of the selected pixel is only stored in subsequent iterations if that pixel is being selected for the first time. Once the stop condition is met, the working images are combined and the original pixel amplitudes are replaced in the image; the sidelobes are subtracted, but the real points are restored.

Another CLEAN improvement developed by Essex modifies the method of selecting the peaks to be worked on. The amplitude and phase statistics of the contributions of each sub-aperture to a given pixel can be used to augment the magnitude of the peak in the selection process. FIG. 11 illustrates the addition of the weighting functions in the peak selection. This flowchart is the same as FIG. 10, except that the "Combine sub-aperture images" step is broken into two steps. In the first of the two steps, the sub-aperture statistics are calculated; in the second of the two steps, the sub-aperture images are combined and then weighted using a weighting function created from one or more sub-aperture statistics. The weighting function will emphasize real peaks and de-emphasize sidelobes and aliases, allowing a better selection of points to be cleaned. Note that the working images, the impulse response models, and the stored amplitudes may be weighted or unweighted. Weighted may allow for faster processing, but unweighted preserves more information about the image.

One useful statistic is the coherence of pixels over the sub-apertures. To calculate this statistic, the sub-aperture images are summed both coherently and incoherently. The magnitude of the coherent sum is divided by the incoherent sum; in other words, the magnitude of the sum is divided by the sum of the magnitudes. Coherence is a measure of the uniformity of the phase over the sub-apertures. Real peaks will generally have high coherence, while sidelobes will have low coherence. FIG. 12 depicts a slice of a 3-D impulse response, as in FIG. 8, as well as a slice of its coherence. The coherence is on a linear scale. The sub-apertures used to calculate the coherence are the individual elevations of the 3-D collection. Note that the coherence at the peak is high because the tubes from the individual elevations constructively add there, while the coherence in the sidelobes is low because the tubes destructively interfere in that region. The coherence rises again in the aliases because the tubes do not overlap and can no longer destructively interfere. The coherence can therefore help distinguish peaks from sidelobes, but not from aliases.

Another useful statistic is the variance of the sub-aperture magnitudes of a pixel, which can help distinguish peaks from aliases. Real peaks will tend to have a fairly low variance in the magnitudes, while voxels that are not real peaks will have more-random magnitudes. FIG. 12 also shows a slice of the magnitude variance of the 3-D impulse response, on a linear scale. The variance is low at the peak and in the sidelobes, where the tubes overlap, but high in the aliases where they do not. Therefore the magnitude variance can help distinguish peaks from aliases, but not sidelobes.

Many variations are possible to create weighting functions. Other statistical moments such as skewness and kurtosis can also be used because they vary between real peaks, sidelobes and aliases. Linear and sigmoid transfer functions are often useful in creating weighting functions from the statistics. A transfer function may combine multiple statistics to more effectively distinguish real peaks. The choice of transfer function depends on the balance desired between sidelobe and alias suppression and the possible suppression of real peaks.

FIG. 13 demonstrates the use of weighting functions created from coherence and magnitude variance statistics. The upper left image shows the same slice of a 3-D impulse as FIG. 8. This and all images in this figure are on a 35 dB log scale. The upper right image shows the slice with coherence weighting applied. In this case the coherence weighting is simply the coherence; no transfer function is used to modify the coherence before it is applied to the coherent sum. The coherence reduces the sidelobes more than the aliases. The lower left image shows the slice with magnitude variance weighting applied. The magnitude variance weighting was created by normalizing the magnitude variance, and then subtracting it from 1 so that areas of low variance are not attenuated while areas of high variance are. This weighting reduces the aliases more than the sidelobes. The lower right image shows the slice with both weightings applied, and both sidelobes and aliases greatly reduced. It is therefore easier to find the real peak for processing by the CLEAN algorithm.

Essex has also discovered that sub-aperture statistics can be used to create weighting functions for sidelobe and alias reduction to augment CLEAN. This augmentation helps reduce the effects of imperfect impulse response models. An imperfect impulse response model will cause artifacts in the output of CLEAN, but sub-aperture statistics reduce those artifacts. FIG. 14 illustrates this invention. FIG. 14 is basically the same as FIG. 10, except that the final "Combine sub-aperture images" step has been split into two steps. In the first of the two steps, the sub-aperture statistics are calculated; in the second of the two steps, the sub-aperture images are combined and then weighted using a weighting function created from one or more sub-aperture statistics. The "Replace original pixel amplitudes" step that follows these steps may also be inserted before or between those two steps if the pixel amplitudes for the sub-aperture images are stored instead of the full-aperture image.

Generally, sub-aperture statistics are used for both peak selection and additional sidelobe and alias mitigation. Using the statistics in both ways tends to yield the best results.

Weighting functions based on sub-aperture statistics can also be used to create a "quick-CLEAN" process that takes less time than the full CLEAN process. The quick-CLEAN process is illustrated in FIG. 15. Sub-aperture statistics are calculated from the "dirty" sub-aperture images. Usually a statistic that works effectively on sidelobes, such as coherence, is combined with a statistic that works effectively on aliases, such as magnitude variance. The sub-aperture images are combined and weighted to produce the "clean" image. The sidelobe and alias suppression is not as effective as when CLEAN is used, but it is much faster.

Sub-apertures may be inherent in the data or artificially created. An example of inherent sub-apertures is the individual passes of a multi-pass 3-D SAR collection. Another example is breaking a SAR data set up by frequency or by pulse. An example of artificially creating sub-aperture is using an FFT to obtain the frequency space of a SAR image, and breaking that frequency space into tiles. Each tile of the original frequency space is then treated as a sub-aperture. Polyphase filtering techniques may also be used to create this type of sub-aperture.

These methods can be used with all synthetic aperture techniques and not just SAR. Synthetic aperture techniques may also be found, for example, in ultrasound, radio astronomy, radiometry, optical telescopes, microscopy, magnetic resonance imaging, and radar. They also may be used in real-aperture imaging systems, such as phased-array radars or telescopes with segmented mirrors, where the aperture can be broken into sub-apertures.

What is claimed is:

1. A method of enhancing a CLEAN algorithm comprising:
    breaking an aperture used to create an image into a plurality of sub-apertures,
    selecting image pixels for which sidelobes or aliases are to be removed,
    storing amplitudes of pixels that have not been worked on before,
    modeling and subtracting scaled impulses from the selected pixels in each individual sub-aperture,
    repeating the selecting, storing and subtracting steps until a stop condition is met, and
    substituting the stored pixel amplitudes into the image.

2. The method of claim 1 comprising selecting points in a CLEAN algorithm.

3. A method of enhancing a CLEAN algorithm comprising:
    breaking an aperture used to create an image into a plurality of sub-apertures,
    modeling and subtracting impulses for each individual sub-aperture, and
    selecting points in a CLEAN algorithm, wherein the method of selecting points in a CLEAN algorithm comprises:
    calculating sub-aperture statistics,
    generating at least one weighting function based on the calculated sub-aperture statistics, and combining and weighting sub-aperture images using the weighting function.

4. A method of enhancing a CLEAN algorithm comprising:
    breaking an aperture used to create an image into a plurality of sub-apertures,
    selecting image pixels for which sidelobes or aliases are to be removed,
    wherein the step of selecting image pixels comprises:
    calculating sub-aperture statistics,
    generating at least one weighting function based on the calculated sub aperture statistics, and
    combining and weighting sub-aperture images using the weighting function,
    storing amplitudes of pixels that have not been worked on before,
    modeling and subtracting scaled impulses from the selected pixels in each individual sub-aperture,
    repeating the selecting, storing and subtracting steps until a stop condition is met, and
    substituting the stored pixel amplitudes into the image.

5. A method of enhancing a CLEAN algorithm comprising:
    breaking an aperture used to create an image into a plurality of sub-apertures,
    selecting image pixels for which sidelobes or aliases are to be removed,
    storing amplitudes of pixels that have not been worked on before,
    modeling and subtracting scaled impulses from the selected pixels in each individual sub-aperture,
    repeating the selecting, storing and subtracting steps until a stop condition is met,
    substituting the stored pixel amplitudes into the image,
    calculating sub-aperture statistics,
    generating at least one weighting function based on the calculated sub-aperture statistics, and weighting the image with the at least one weighting function.

* * * * *